United States Patent [19]

Takei et al.

[11] Patent Number: 4,674,540
[45] Date of Patent: Jun. 23, 1987

[54] VALVE DEVICE

[75] Inventors: Toshihiro Takei, Okazaki; Yoshiyuki Hattori, Toyoake; Ken Nomura, Okazaki, all of Japan

[73] Assignee: Nippondenso Co., Ltd., Kariya, Japan

[21] Appl. No.: 802,463

[22] Filed: Nov. 27, 1985

[30] Foreign Application Priority Data

Nov. 28, 1984 [JP] Japan .................. 59-249754

[51] Int. Cl.⁴ .......................................... F15B 13/044
[52] U.S. Cl. ................... 137/625.65; 137/596.17;
137/627.5; 251/129.15; 251/129.21; 251/337
[58] Field of Search .............. 137/596.17, 625.65,
137/627.5; 251/129.15, 129.21, 337

[56] References Cited

U.S. PATENT DOCUMENTS 3,921,666 11/1975 Leiber ..................... 137/627.5 X
3,989,063 11/1976 Brouwers et al. ........... 137/596.17
4,299,252 11/1981 Reinicke .................. 251/129.15 X
4,579,146 4/1986 Tsuru et al. ............... 137/596.17 X

FOREIGN PATENT DOCUMENTS 58-17169 4/1983 Japan .

Primary Examiner—Gerald A. Michalsky
Attorney, Agent, or Firm—Cushman, Darby & Cushman

[57] ABSTRACT

A valve device including a housing formed with a passage, valve elements for opening and closing the passage, a spring for urging the valve elements, and a controller for displacing the valve elements against the spring force. The spring has at least two deflection modes, one of which shows a larger spring constant than the other deflection mode and appears in one of two valve positions. The controller outputs a relatively large force for displacing the valve elements to the valve position at which the spring is deflected at the larger spring constant.

15 Claims, 9 Drawing Figures

VALVE DEVICE

BACKGROUND OF THE INVENTION

1. Field of the Invention

The present invention relates to a valve device provided, for example, in an antiskid control system of a vehicle. More particularly, it relates to a valve device for opening and closing a passage connecting a master cylinder and a wheel cylinder.

2. Description of the Related Art

In a conventional antiskid control system, a construction in which a three-port-three-position valve is provided for increasing, holding, or decreasing a pressure in a wheel cylinder is known. Such a three-port-three-position valve has two valve elements for opening and closing two ports which communicate with the master cylinder and a reservoir for the brake oil. In a valve device described in Japanese Examined Utility Model Publication No. 58-17169, such a three-port-three-position valve has a construction in which a movable member supporting the two valve elements is moved according to an amount of electric current applied to a solenoid, a main spring being provided between the movable member and a casing, and a subspring being provided between one of the valve elements and the movable member. Thus, when an electric current is not applied to the solenoid, the movable member is at a first position in which one of the valve elements closes the corresponding port. Conversely, when a small electric current is applied to the solenoid, the movable member is at a second position against the main spring in which both valve elements close each corresponding port through the force of the subspring. Further, when a large electric current is applied to the solenoid, the movable member is at a third position against the main spring in which one of the above valve elements opens the corresponding port and the other valve element closes the corresponding port, by compressing the subspring.

As described above, in the conventional valve device, two kind of springs are needed, i.e., the main spring and the subspring, and the subspring must be provided between the two valve elements in the movable member. Therefore, the construction of the valve device is complicated. Further, in a construction wherein the two valve elements can take three positions, the spring constants of the main spring and the subspring, and the loads preset to the springs, must correspond precisely to the electromagnetic force of the solenoid.

SUMMARY OF THE INVENTION

Therefore, an object of the present invention is to provide a valve device having a simplified construction in which only one spring can be used, and in which a force for displacing a valve element need not be precisely set.

According to the present invention, there is provided a valve device comprising a housing having first and second passages, a valve means for opening and closing the first and second passages, a spring for urging the valve means with a force according to the amount of deflection of the spring, and a control means for displacing the valve means to one of the valve positions which the valve means can assume. The valve means open the first passage and close the second passage in a first valve position, close the first and second passages in a second valve position, and close the first passage and open the second passage in a third valve position. The spring has first and second deflection modes, and the spring constant of the second deflection mode is larger than that of the first deflection mode. The spring enters the second deflection mode at one of the valve positions.

BRIEF DESCRIPTION OF THE DRAWINGS

The present invention may be more fully understood from the description of preferred embodiments of the invention set forth below, together with the accompanying drawings, in which;

FIG. 5a is a sectional view in which a valve element is at a first valve position;

FIG. 5b is a sectional view in which the valve element is at a second valve position; and FIG. 5c is a sectional view in which the valve element is at a third valve position.

DESCRIPTION OF THE PREFERRED EMBODIMENTS

The present invention will now be described below with reference to the attached drawings.

Figure 1:
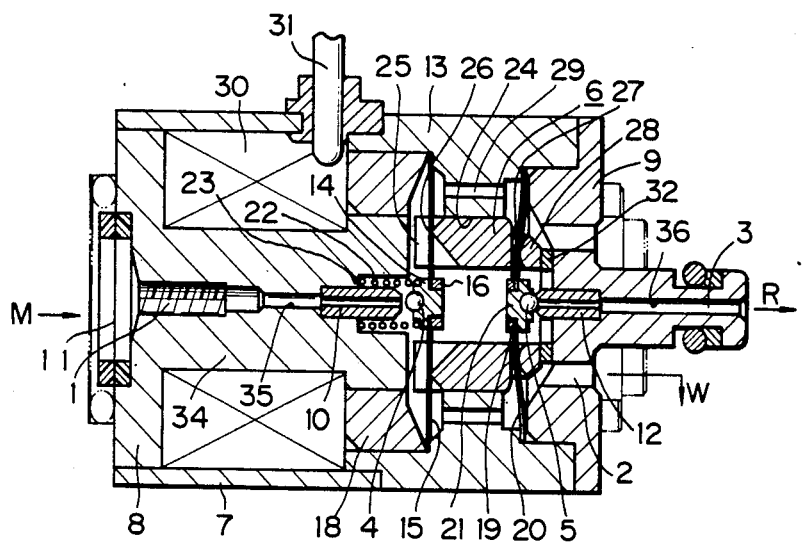
FIG. 1 is a sectional view of a first embodiment of the present invention.

FIG. 1 shows a first embodiment of the present invention. In this drawing, an inlet port 1, first outlet ports 2, and a second outlet port 3 are connected to a master cylinder (not shown), a wheel cylinder (not shown), and reservoir (not shown), respectively. The inlet port 1 is opened and closed by a first valve element 4, and the second outlet port 3 is opened and closed by a second valve element 5. As described later, when a movable member 6 is at a first valve position shown in the drawing, the first valve element 4 opens the inlet port 1 and the second valve element 5 closes the second outlet port 3. When the movable member 6 is at a second valve position, the first and second valve elements 4 and 5 close the ports 1 and 3. When the movable member 6 is at a third valve position, the first valve element 4 closes the inlet port 1 and the second valve element 5 opens the second outlet port 3.

A first port member 8 is fitted in one opening of a cylindrical casing 7 and a cylinder member 13 is fitted in the other opening of the casing 7. A central portion 34 of the first port member 8 extends through the casing 7 to reach one opening of the cylinder member 13; the other opening of the cylinder member 13 holds a second port member 9. An annular retainer 18 is provided between an outer surface of the central portion 34 and an inner surface of the corresponding opening of the cylinder member 13. The central portion 34 is formed with a hole 35 extending in the axis of the central portion 34, and the end of the central portion 34 facing the cylinder member 13 is fitted a pipe member 10, i.e., the inlet port 1 is formed by the hole 35 and the pipe member 10. The outer end of the first port member 8 is provided with a filter 11 through which the inlet port 1 communicates with the master cylinder (not shown). The second port member 9 is formed with a hole 36 extending in the axial direction thereof, and the end of the second port member 9 facing the cylinder member 13 is fitted with a pipe member 12, i.e., the second outlet port 3 is formed by the hole 36 and the pipe member 12. The first outlet ports 2 are formed in the second port member 9 around the second outlet port 3, the first outlet ports 2 being located around the second outlet port 3 at constant intervals in such a manner that the number of first outlet ports 2 is four. The cylinder member 13 is formed with passages 29 for communicating the inlet port 1 to the first outlet ports 2, the passages 29 being located circumferentially in the cylinder member 13.

Figure 2:
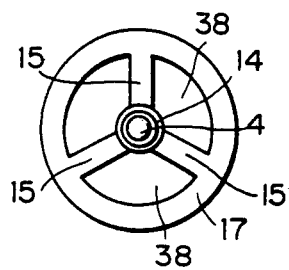
FIG. 2 is a plan view of flat springs of the first embodiment of FIG. 1.

The first valve element 4 is a ball valve located adjacent to an opening of the pipe member 10 to open and close the inlet port 1. The first valve element 4 is fixed in a spherical recess formed in a support member 14 which is connected to free ends of flat springs 15 by a nut 16. As shown in FIG. 2, the flat springs 15 extend in a radial direction about the first valve element 4 and are connected to each other by an annular plate 17 at the outer portion of the flat springs 15. The annular plate 17 is fixed between the annular retainer 18 and the cylinder member 13. Thus, the flat springs 15 are deflected with the fixed ends thereof held by the annular plate 17, so that the first valve 4 element is maintained in close contact with the opening of the pipe member 10 to close the inlet port 1. A coil spring 22 is provided between a spring seat 23 formed around the pipe member 10 and the support member 14 to urge the support member 14 in a direction along which the first valve 4 will separate from the pipe member 10.

Similarly, the second valve element 5 is fixed to a support member 21 by a nut 19, the support member 21 being provided in the free ends of flat springs 20, so that the second valve element 5 located adjacent to the opening of the pipe member 12 opens and closes the second outlet port 3. The flat springs 20 have the same construction as the flat springs 15, i.e., the flat springs 20 extend in a radial direction and are connected to each other by an annular plate, similar to the annular plate 17, which is fixed between the cylinder member 13 and the second port member 9, so that the flat springs 20 are deflected with the fixed ends thereof held by the annular plate.

The flat springs 15 and 20 are deflected by the movable member 6 which is engageble with the springs 15 and 20. The movable member 6 has a cylindrical shape, and is slidably fitted in an inner hole 24 of the cylinder member 13. A front portion of the movable member 6 is formed with radial grooves 25 for receiving the flat springs 15, and a part of this portion of the movable member 6 is formed into an angular shape so that the peak of the angle is in contact with the flat springs 15, thus forming pressing portions 26 as shown in FIG. 1. On the other hand, rear portions of the movable member 6 are formed with radial holes 27 through which the flat springs 20 extend, rear walls of the holes 27 being formed with a semi-circular section so that pressing portions 28 engageble with the flat springs 20 are formed. The movable member 6 is urged against and engages with a stopper 32 provided on an inner surface of the second port member 9 by the flat springs 15, at the position shown in FIG. 1.

The movable member 6 is made of a magnetic material, so that, when the solenoid 3a is energized, the movable member 6 is drawn to the left in FIG. 1. The solenoid 30 is provided between the casing 7 and the first port member 8, and is fixed there by a retainer 18 made of a non-magnetic material. The solenoid 30 is connected to an electric source (not shown) through a lead line 31.

In this embodiment, the solenoid 30 is operated in three states, i.e., a state in which no electric current is applied, a state in which a relatively small electric current is applied, and a state in which a relatively large electric current is applied, and thus the movable member 6 can be set in three positions.

A first passage is constructed by the inlet port 1, the spaces 38 (FIG. 2) of the flat springs 15, the passages 29, the spaces of the flat springs 20, and the first outlet ports 2. A second passage is constructed by the first outlet ports 2, the radial holes 27 of the movable member 6, and the second outlet port 3.

Operation of the movable member 6 is described with reference to FIGS. 3a, 3b, and 3c.

Figure 3A:
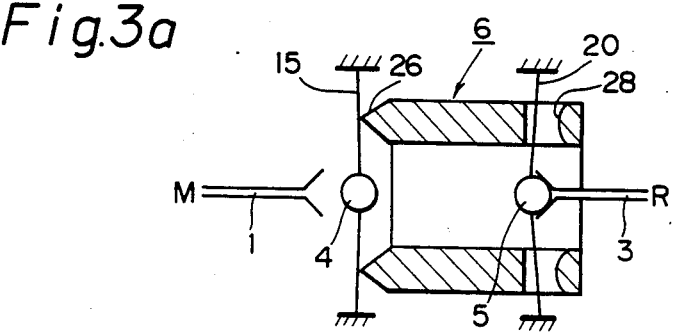
FIG. 3a is a sectional view of valve elements and flat springs when a movable member is at a first valve element position.

FIG. 3a shows a state is which an electric current is not applied to the solenoid 30. In this state, the movable member 6 is at a first valve position, so that the front portion 26 is in contact with the flat springs 15 and the rear portion 28 is not in contact with the flat spring 20. That is, the movable member 6 is urged to the right in the drawing by the force of the flat springs 15, and thus the first valve element 4 opens the inlet port 1. Accordingly, the second outlet port 3 is closed by the second valve element 5 through the force of the flat springs 20. Therefore, brake oil flows into the inlet port 1 and flows to the first outlet port 2 through the spaces 38 of the springs 15, the passages 29, and spaces between the flat springs 20, and is supplied to the wheel cylinder (not shown). As a result, pressure in the wheel cylinder (not shown) is increased.

Figure 3B:
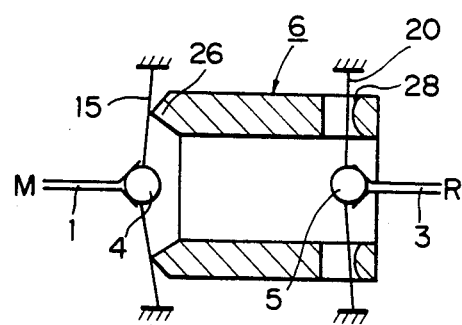
FIG. 3b is a sectional view of the valve elements and the flat springs when the movable member is at a second valve position.

FIG. 3b shows a state in which a relatively small electric current is supplied to the solenoid 30. In this state, the movable member 6 is moved by the solenoid 30 to a second valve position which is slightly to the left of the first valve position. When the movable member 6 is in this second valve position the flat springs 15 are deflected by the portion 26, so that the first valve element 4 is in close contact with the opening of the inlet port 1, to close the inlet port 1. At this position, the rear portion 28 is not in contact with the flat springs 20, so that the second valve element 5 is urged by the flat springs 20 to close the second outlet port 3. Therefore, both of the ports 1 and 3 are closed and pressure in the wheel cylinder (not shown) is kept at a constant value.

Figure 3C:
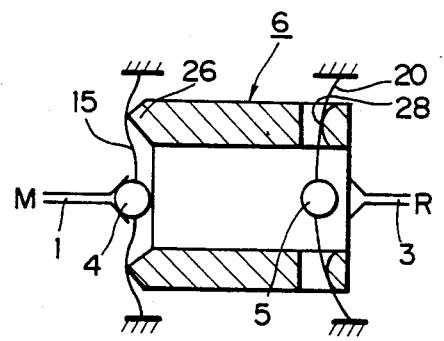
FIG. 3c is a sectional view of the valve elements and the springs when the movable member is at a third valve position.

FIG. 3c shows a state in which a relatively large electric current is applied to the solenoid 30. The movable member 6 is moved further to the left in comparison with the second valve position by the solenoid 30, to a third valve position. When the movable member 6 is in position, the flat springs 15 are more strongly urged by the portion 26, so that the inlet port 1 is closed by the first valve element 4 and the flat springs 20 are urged by the rear portion 28 to separate the second valve element 5 from and open the second outlet port 3. Thus, the first valve element 4 closes the inlet port 1 and the second valve element 5 opens the second outlet port 3, so that brake oil in the wheel cylinder (not shown) flows into the valve device through the first outlet port 2 and returns to the reservoir (not shown) through the second outlet port 3, and as a result, pressure in the wheel cylinder (not shown) is reduced.

As shown in FIG. 3b, a deflection curve of the flat springs 15 when the movable member 6 is at the second valve position is essentially different from a deflection curve of the flat springs 15 when the movable member 6 is at the third valve position shown in FIG. 3c. That is, the deflection curve in FIG. 3b does not have inflection points while the deflection curve in FIG. 3c has such inflection points. In other words, the flat springs 15 deflect in a first deflection mode at the second valve position, and in a second deflection mode at the third valve position. Thus, the spring constant $K_3$ of the flat springs 15 when the movable member 6 is in the third valve position is larger than the spring constant $K_2$ of the flat springs 15 when the movable member 6 is in the second valve position. Therefore, to shift the movable member 6 from the second valve position to the third valve position, the movable member 6 must be urged by a relatively large force.

Figure 4:
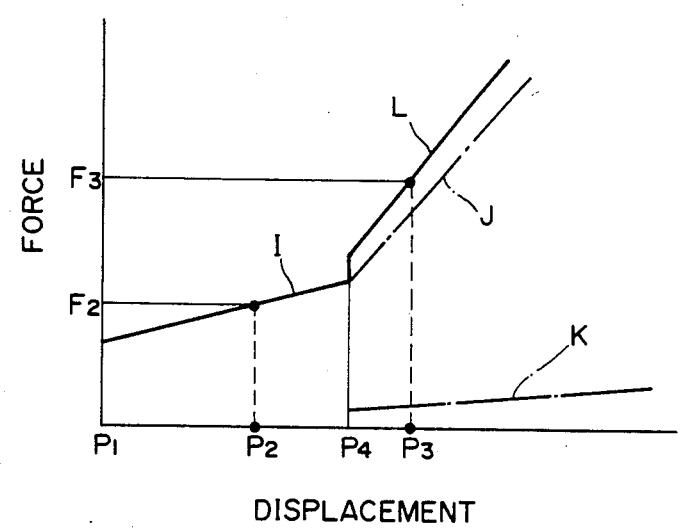
FIG. 4 is a graph showing a relationship between a displacement of the movable member and a force applied to the movable member.

FIG. 4 shows a relationship between a displacement and a force applied to the movable member 6, namely, a relationship between displacements of the flat springs 15 and 20 and the spring forces thereof. In FIG. 4, points $P_1$, $P_2$, and $P_3$ show the first, second, and third valve positions of the movable member 6, respectively. When the movable member 6 is located near the second valve position, a force necessary for displacement of the movable member 6 is such that the flat springs 15 are deflected in the first deflection mode shown in FIG. 3b, and varies along the straight line I in proportion to the displacement. Then, if the movable member 6 displaces over the point P in FIG. 4, the flat springs 15 are deflected in the second deflection mode as shown in FIG. 3c, and the flat springs 20 are also deflected. In this condition, a force necessary for deflecting only the flat springs 15 varies, as shown by the straight chained line J. However, since a force necessary for deflecting the flat springs 20 varies as shown by the straight chained line K, a force necessary for displacing the movable member 6 is obtained by superimposing the force applied to the flat springs 15 and the force applied to the flat springs 20 so that a variation of the force for the movable member 6 is as shown by the solid line L. Therefore, a force $F_3$ necessary for displacing the movable member 6 to the third valve position must be double a force $F_2$ necessary for displacing the movable member 6 to the second valve position. In short, past the point $P_4$ in the FIG. 4, the force for displacing the movable member 6 becomes suddenly large, so that the movable member 6 is not displaced to the third valve position by a force only slightly larger than the force $F_2$.

Note that where the flat springs 20 are not provided, the second valve element 5 is connected to the movable member 6 through a connecting member.

Figure 5A:
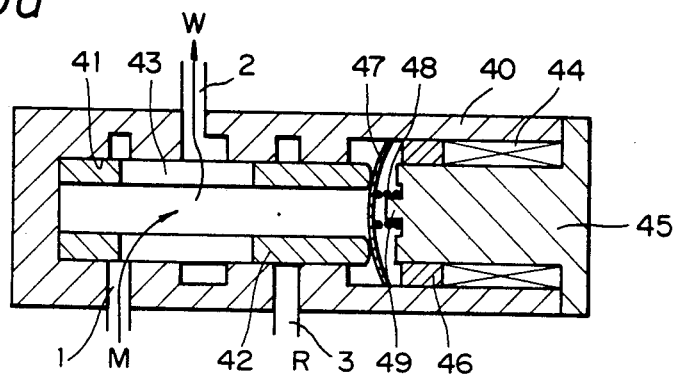
FIGS. 5a to 5c show a second embodiment of the present invention.
Figure 5B:
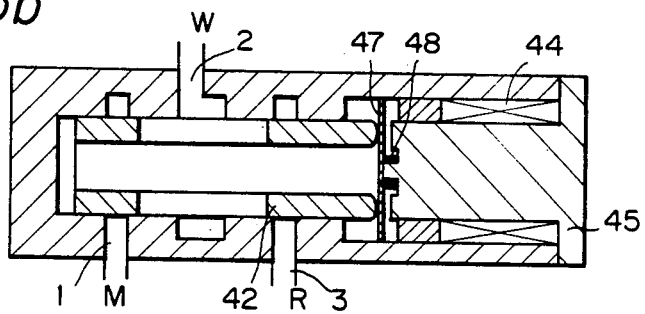
Figure 5C:
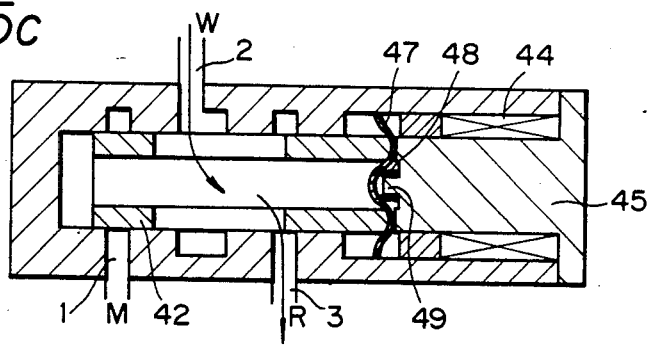

FIG. 5a, 5b and 5c shown a second embodiment of the present invention. In this second embodiment, the valve device is provided with a spool valve.

A casing 40 is formed with an inlet port 1 and first and second outlet ports 2 and 3. A spool valve 42 is slidably housed in a bore 41 formed in the casing 40. The spool valve 42 has a passage 43 for allowing brake oil to flow from the inlet port 1 to the first outlet port 2 and for brake oil to flow from the first outlet port 2 to the second outlet port 3. A solenoid 44 is mounted between the casing 40 and a core 45 fitted in the casing 40, and fixed by a non-magnetic annular seal 46 fitted on an end portion of the core 45. A flat spring 47 is inserted between an end portion of the core 45 and an end portion of the spool valve 42, the outer periphery of the flat spring 47 being fixed to an inner wall of the casing 40. A coil spring 48 is provided around a projection 49 formed on the end face of the core 45 to press against the flat spring 47 so that the flat spring 47 is always in contact with the spool valve 42.

The position of the spool valve 42 is varied according to the amount of electric current applied to the solenoid 44. FIG. 5a shows a state in which an electric current is not applied to the solenoid 44. In this state, the spool valve 42 is located at the left in the drawing, namely, a first valve position, by the flat spring 47 and the coil spring 48, so that the inlet port 1 communicates with the first outlet port 2. As a result, brake oil discharged from a master cylinder (not shown) is supplied to a wheel cylinder (not shown) through the inlet port 1, the spool valve 42, and the first outlet port 2, and thus pressure in the wheel cylinder (not shown) is increased.

FIG. 5b shows a state in which a relatively small electric current is applied to the solenoid 44. In this state, the spool valve 42 is moved to the second valve position by the solenoid 44. That is, the spool valve 42 presses against the coil spring 48 and the flat spring 47 to flatten the flat spring 47 and bring it into contact with the projection 49, so that the inlet port 1 and the second outlet port 3 are closed and thus the passages among the ports 1, 2, and 3 are shut. As a result, the wheel cylinder (not shown) is closed-off from the master cylinder (not shown) and a reservoir (not shown), and thus pressure in the wheel cylinder (not shown) is kept at a constant value.

FIG. 5c shows a state in which a relatively large electric current is applied to the solenoid 44. In this state, the spool valve 44 is strongly moved by the solenoid 44 to the third valve position. That is, the spool valve 42 is located at the right in the drawing and the flat spring 47 deflected into a wave shape so that a circular portion around the center of the flat spring 47 is deflected away from, i.e., convexly, the core 45 and the portions either side of center portion of the flat spring 47 are deflected away from, i.e., convexly, the spool valve 42. Thus, the spool valve 42 connects the first outlet port 2 to the second outlet port 3. As a result, brake oil in the wheel cylinder (not shown) is returned to the reservoir (not shown) and thus pressure in the wheel cylinder (not shown) is reduced.

In this second embodiment, although the spool valve 42 comprises an armature which is moved by electromagnetic force generated by the solenoid 44, an armature may be provided independent of the spool valve 42. Also, it is not necessary for the casing 40 to form a part of an electromagnetic circuit with the spool valve 42 and the core 45. Further, in the second embodiment, substantially the same function can be shown by a construction without the coil spring 48.

Note, although each of the above embodiments is constructed in such a manner that the movable member 6 and the spool valve 42 can take the first, second, and third valve positions, in another embodiment the construction may be such that the movable member 6 and the spool valve 42 take any two valve positions among the above three valve positions, and the flat springs 15 and 47 deflect in the second deflection mode in one of the two valve positions.

Further, the means for displacing the valves need not be operated by an electromagnetic force from the solenoid, but can be operated by a hydraulic force such as oil pressure.

Although embodiments of the present invention have been described with reference to the attached drawings, many modifications and changes may be made by those skilled in this art without departing from the scope of the invention.

We claim:

1. A valve device for opening and closing a first and a second passage, said valve device comprising:
   a housing formed with said first and second passages,
   first and second valve means respectively for opening and closing said first and second passages, said first and second valve means respectively opening said first passage and closing said second passage in a first valve position, said first and second valve means respectively closing said first and second passages in a second valve position, and said first and second valve means respectively closing said first passage and opening said second passage in a third valve position,
   an integral spring member for urging said first valve means with a force according to the amount of deflection of said spring means, said spring member having a first and a second deflection mode, the spring constant of said second deflection mode being larger than that of said first deflection mode, said spring member entering said second deflection mode at one of said valve positions,
   means coordinating movement of said second valve means among said first, second and third valve positions with said first valve means, and
   a control means for displacing said first valve means to one of said valve positions against the force of said spring member.

2. A valve device according to claim 1, wherein said spring member comprises a first flat spring having a fixed end supported within said housing and a free end connected to said first valve means.

3. A valve device according to claim 2, wherein said coordinating means comprises a second flat spring extending in a radial direction, having a fixed end connected to said fixed end of said spring member, said fixed end being supported in said housing, and having a free end connected to said second valve means.

4. A valve device according to claim 3, wherein said coordinating means further comprises a movable member slidably supported in said housing, said movable member being engageble with said first and second flat springs, said movable member being in said first valve position so that said first valve element opens and said second valve element closes corresponding ports, said movable member being in said second valve position to deflect said first flat spring in said first deflection mode so that said first and second valve elements close corresponding ports and said movable member being in said third valve position to deflect said first flat spring in said second deflection mode and deflect said second flat spring so that said first valve element closes and said second valve opens corresponding ports.

5. A valve device according to claim 1, wherein said first and second valve means and said coordinating means comprise a spool valve slidably housed in said housing, said spool valve being in said first valve position to open said first passage and close said second passage, said spool valve being in said second valve position to deflect said spring member in said first deflection mode to close said first and second passages, and said spool valve being in said third valve position to deflect said spring member in said second deflection mode to close said first passage and open said second passage.

6. a valve device according to claim 5, wherein said spring member comprises a flat spring engaging with said spool valve, and said valve device further includes a coil spring urging said flat spring toward said spool valve.

7. A valve device according to claim 1, wherein said control means comprises a solenoid urging said first valve means to one of said valve positions according to an electric current applied thereon.

8. A valve device for opening and closing a passage, said valve device comprising:
   a housing formed with said passage,
   a valve means for opening and closing said passage, said valve means opening said passage in one valve position, said valve means closing said passage in another valve position,
   an integral spring member for urging said valve means with a force according to the amount of deflection of said spring member, said spring member having a first and a second deflection mode, the spring constant of said second deflection mode being larger than that of said first deflection mode, said spring member entering said second deflection mode at one of said valve positions, and
   a control means for displacing said valve means to one of said valve positions against the force of said spring member.

9. A valve device according to claim 8, wherein said spring member comprises a flat spring having a fixed end supported in said housing and a free end connected to said valve means.

10. A valve device according to claim 8, wherein said spring member comprises a plurality of flat spring leaves angularly spaced from one another about an axis and each extending in a radial direction, each said spring leaf having a fixed end said fixed fixed ends being integrally connected to one another, said supported in said housing, and each said spring leaf having a free end connected to said valve means.

11. A valve device according to claim 8, wherein said first spring member comprises a first flat spring, said valve device further comprising a second flat spring and said housing being formed with another said passage, said first and second flat springs having respective fixed ends supported in said housing, said valve means comprising a first valve element for opening and closing the first-mentioned said passage and a second valve element for opening and closing said other passage, said first flat spring having a free end connected to said first valve element, and said second flat spring having a free end connected to said second valve element.

12. A valve device according to claim 11, wherein said valve means further comprises a moveable member slidably supported in said housing, said moveable member being engagable with said first and second flat springs, said movable member being arranged for deflecting at least one of said flat springs so that at least one of said first and second valve elements is switched from one of said valve positions to another of said valve positions.

13. A valve device according to claim 8, wherein said valve means comprises a spool valve slidably housed in said housing, said spool valve being in contact with said spring member, said spool valve being arranged for deflecting said spirng member so that said valve means is switched from one of said valve positions to another of said valve positions.

14. A valve device according to claim 13, wherein said spring member comprises a flat spring and said valve device further comprises a coil spring, said flat spring engaging with said spool valve, said coil spring urging said flat spring toward said spool valve.

15. A valve device according to claim 8, wherein said control means comprises a solenoid urging said valve means to one of said valve positions according to an electric current applied thereon.

* * * * *